United States Patent [19]

Eades

[11] Patent Number: 4,579,640
[45] Date of Patent: Apr. 1, 1986

[54] ELECTROSTATIC WATER TREATER

[76] Inventor: T. Edgar Eades, 18-35 Oakmount Ct., SW., Calgary, Alberta, Canada, T2V 4Y3

[21] Appl. No.: 762,290

[22] Filed: Aug. 5, 1985

[30] Foreign Application Priority Data

Feb. 3, 1984 [CA] Canada .................................. 446727

[51] Int. Cl.⁴ ............................................. B03C 5/00
[52] U.S. Cl. ................................................. 204/302
[58] Field of Search ................ 204/149, 186, 272, 302

[56] References Cited

U.S. PATENT DOCUMENTS

| | | | |
|---|---|---|---|
| 4,024,047 | 5/1977 | Clark | *204/302 |
| 4,199,429 | 4/1980 | McMahon | 204/302 |
| 4,199,430 | 4/1980 | McMahon | 204/302 |
| 4,293,400 | 10/1981 | Liggett | 204/272 |

Primary Examiner—T. M. Tufariello
Attorney, Agent, or Firm—Norris M. Eades

[57] ABSTRACT

An improved electrostatic water treatment apparatus is described which can operate for long periods without failure in very harsh environments, such as extreme and rapid temperature variations. It includes an elongated, cylindrical electrode having end closure cap members. At least one of these end caps has cylindrical side walls with an inner portion thereof telescoping within the cylindrical electrode and an outer shoulder portion extending axially outwardly beyond the end of the electrode. A continuous coating of silicone adhesive is provided over the exterior of the electrode and the outwardly extending shoulder portion of the end cap. A thin, impervious insulating sleeve then overlies the silicone adhesive coating, covering the exterior of the electrode and the outwardly extending shoulder portion of the end cap. Ring clamp means are provided surrounding the outwardly extending shoulder portion of the end cap and this ring clamp securely clamps the insulating sleeve and silicone adhesive coating to the end cap.

8 Claims, 4 Drawing Figures

U.S. Patent  Apr. 1, 1986  4,579,640
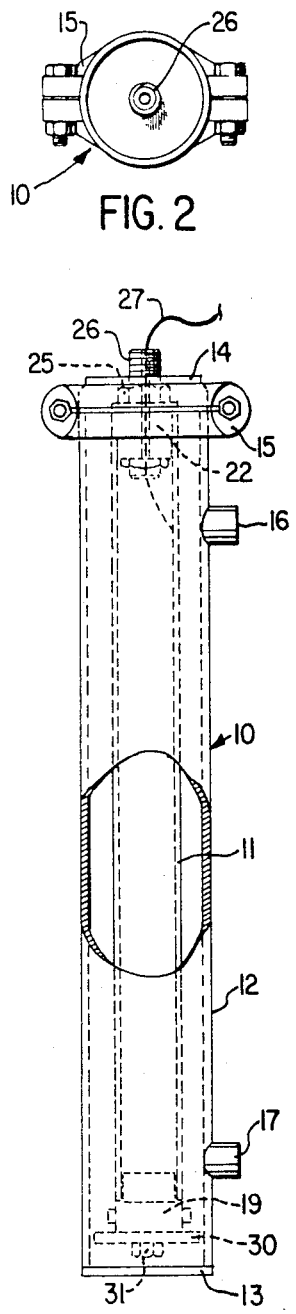
FIG. 2
FIG. 1
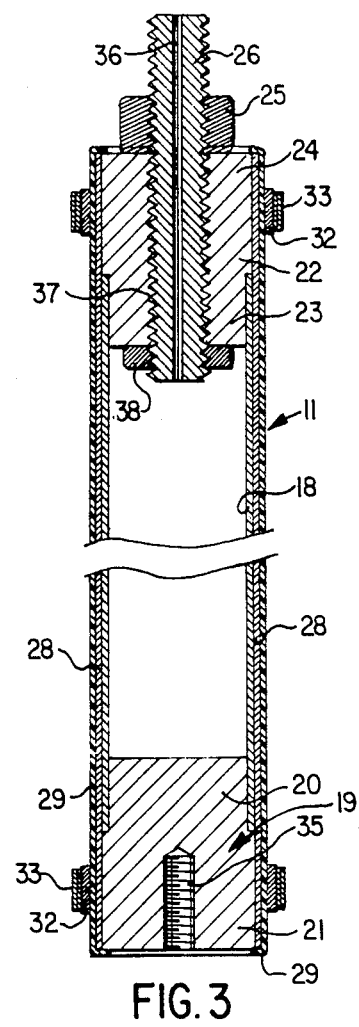
FIG. 3
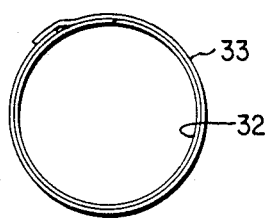
FIG. 4

ELECTROSTATIC WATER TREATER

This invention relates to electrostatic water treaters and, more particularly, to an improved sealing arrangement for the electrode.

Electrostatic water treaters have been in use for many years. In a typical system, a hollow electrode having an insulating coating on its outer surface is positively charged by a high positive voltage (e.g. up to 12,000 volts). This electrode is placed at the centre of an externally grounded metal shell and the water to be treated flows through the shell, following an annular path around the electrode. The electrical field which is introduced into the system increases the repulsive force on particles of like charge in the water and thus prevents them from reaching the surface and producing scale. Manipulation of the pH and control of the total solids in the solution is usually necessary in evaporative systems, such as boilers and cooling towers. The best operation of the treater is usually obtained in the absence of suspended material such as algae, iron oxide and dust, because they act as seed for precipitation. The electrostatic water treater used with proper supervision has proven to be a highly useful device.

However, operational problems have continued with these devices. One problem has been that of water leakage either into the electrode or between the electrode and the insulating coating. This causes shorting to ground and a resultant decrease in efficiency of the system. This problem is particularly severe in systems used to treat boiler water where abrupt water temperature changes tend to occur.

Another problem is that of small air bubbles or pockets which tend to form between the electrode and the insulating coating. A corona discharge may occur at such air procket resulting in an arcing which cuts a hole through the electrode and insulating coating. This in turn results in a total breakdown of the system.

Various patents have issued which have attempted to solve these problems. One attempt is described in Clark et al U.S. Pat. No. 4,024,047, which utilizes a system of O-rings and end caps for the electrode. While this system works well in cold water conditions, it was still found to be subject to failure in the extreme conditions of boiler water treatment.

Another design to try to prevent such leaks is described in McMahon, U.S. Pat. No. 4,199,430. In this design, a frustoconical outer surface engages with a similar surface formed on the interior of the outer shell and this arrangement includes a cylindrical, inwardly directed seal face for sealed engagement with the outer surface of the electrode. Thus, the vertical movement of the frustoconical surfaces serves to tightly clamp the cylindrical seal face against the outer surface of the electrode. Once again, this system was found to be generally unsatisfactory for use in the very extreme conditions of boiler water treatment.

It is, therefore, the object of the present invention to provide a new type of sealing arrangement for the electrode, which can withstand rapid expansion and contraction without failure.

Thus, the present invention in its broadest aspect relates to an electrode assembly for an electrostatic water treatment apparatus. It includes an elongated, cylindrical electrode having end closure cap members. At least one of these end caps has cylindrical side walls with an inner portion thereof telescoping within the cylindrical electrode and an outer shoulder portion extending axially outwardly beyond the end of the electrode. A continuous coating of silicone adhesive is provided over the exterior of the electrode and the outwardly extending shoulder portion of the end cap. A thin, impervious insulating sleeve then overlies the silicone adhesive coating, covering the exterior of the electrode and the outwardly extending shoulder portion of the end cap. Ring clamp means are provided surrounding the outwardly extending shoulder portion of the end cap and this ring clamp securely clamps the insulating sleeve and silicone adhesive coating to the end cap.

The feature which makes this particular system function so successfully is the use of the silicone adhesive coating. This adhesive is a good electrical insulator, particularly at elevated temperatures and under damp conditions. After curing, this adhesive remains resilient and appears to bond well to the surface of the electrode. Even under the extreme temperature change conditions that are encountered in the treatment of boiler water, the bond between the silicone adhesive and the electrode and the contact between the silicone adhesive and the outer sleeve seems to remain intact and resistant to water penetration as well as resistant to formation of air pockets between the electrode and the outer sleeve. Because of this, elaborate clamping or O-ring arrangements such as those described in the prior art are not necessary and simple ring clamps can be used at the ends of the electrode to firmly clamp the sleeve and the silicone adhesive coating to the electrode.

The thickness of the silicone adhesive coating is not critical, although it should be of substantial thickness for best results. If the coating is too thin, its effectiveness under extreme temperature changes is diminished. A coating having a thickness of about 10 mils has been found to be highly effective.

Preferably the electrode is made from aluminum and is closed at both ends by closure caps made from an insulating material such as polytetrafluoroethylene. Each closure cap preferably has cylindrical side walls with an inwardly stepped portion telescoping within the cylindrical electrode and an outer shoulder portion extending axially outwardly beyond the end of the electrode. Preferably the ring clamps are tightened around these end closure cap outer shoulder portions.

In the drawings which illustrate the present invention:

FIG. 1 is an elevation of a preferred form of water treatment unit according to the invention;

FIG. 2 is a top plan view of FIG. 1;

FIG. 3 is an enlarged section through the inner electrode of this invention; and FIG. 4 is a plan view of a ring clamp.

In FIG. 1, the reference numeral 10 designates an outer shell assembly and reference numeral 11 designates the novel inner electrode assembly of this invention. The outer shell includes a cylindrical shell portion 12 having a bottom end cap 13 permanently welded thereto. The top end of the shell has a removable liquid tight cap 14 held in place by a standard coupling 15, which is readily available for pressure systems. If desired, the welded bottom end cap 12 can be replaced with a removable cap of the same type as that used for the top end.

Water to be treated flows in through inlet opening 16 and the treated water flows out through the outlet opening 17. Within the unit, the water travels in an annular passage between the electrode 11 and the shell 10.

The inner electrode 11 is shown in greater detail in FIG. 3. The main component of the electrode is a cylindrical aluminum tube 18. Into the lower end of this tube 18 is inserted an end plug 19 having an inwardly extending stepped portion 20 and an axially outwardly extending shoulder portion 21. This end plug 19 includes a tapped hole 35 adapted to receive a bolt 31 for holding in place a spacer 30. The spacer 30 serves to keep the bottom end of the electrode centered within the shell 10.

The upper end of the electrode is closed by an end cap 22 having a radially inwardly stepped portion 23 telescoping within the tube 18 and an axially outwardly projecting shoulder portion 24. A further radially inwardly stepped portion 25 projects axially outwardly from shoulder portion 21. This portion 25 serves as a spacer between the electrode 11 and the top 14 of shell 10. Projecting axially outwardly from the spacer 25 is a threaded nipple 26 which passes through a hole in cap 14 and is held in place in the cap by means of a nut. This threaded nipple 26 also extends through an axial hole 37 in end cap 22 and is held at the inner end by nut 38. An axial hole 36 extends through the nipple 26 for an electrical lead wire 27 which passes into aluminum tube 18 and is connected thereto.

With the end caps 19 and 22 in place, a coating of silicone adhesive is applied over the aluminum tube 18 and the projecting portions of the end caps 19 and 22. As an example of a suitable silicone adhesive there can be mentioned Silgrip ® manufactured by General Electric. The adhesive is used in the form of a fluid mixture with a silicone resin catalyst such as SRC 18 produced by General Electric. This mixture is applied to the surface, e.g. by means of a roller until a thickness of about 10 mils has built up on the surface.

It has been found to be particularly advantageous to thoroughly clean the exterior surface of the aluminum tube and to chemically etch the surface thereof before applying the silicone adhesive. The etching can conveniently be done with a commercial metal etching solution, such as Dupont M-3 metal conditioner.

The adhesive coating is allowed to cure for several days at room temperature until it becomes non-tacky but still resilient. Then the insulating sleeve 29 is fitted over the silicone layer 28. This insulating sleeve can conveniently be formed from a polytetrafluoroethylene film.

With the sleeve 29 in place, ring clamps are fixed at each end. Each ring clamp is preferably in the form of an aluminum split ring 32 surrounded by a steel tensioning band 33, such as a BAND-IT ®.

While certain forms of the present invention have been described and illustrated, it is not to be limited thereto except insofar as such limitations are included in the following claims.

I claim:

1. An electrode assembly for an electrostatic water treatment apparatus comprising:
   (a) an elongated, cylindrical electrode,
   (b) end closure cap members for said electrode, at least one of said end caps having cylindrical side walls, with an inner portion thereof telescoping within said cylindrical electrode and an outer shoulder portion thereof extending axially outwardly beyond the end of the electrode,
   (c) a continuous coating of silicone adhesive covering the exterior of the electrode and the outer shoulder portion of the end cap,
   (d) a thin, impervious insulating sleeve overlying the silicone adhesive coating and also covering the exterior of the electrode and the outer shoulder portion of the end cap, and
   (e) ring clamp means surrounding said outer shoulder portion of the end cap and securely clamping the insulating sleeve and silicone adhesive coating thereto,
   thereby permitting rapid expansion and contraction of the assembly due to sudden temperature changes while preventing leakage of water into the interior of the electrode or between the electrode and the insulating sleeve.

2. The assembly of claim 1 wherein the electrode has two end closure caps, each having cylindrical side walls, with an inner portion thereof telescoping within said cylindrical electrode and an outer shoulder portion thereof extending outwardly beyond the end of the electrode.

3. The assembly of claim 2 wherein one of said closure caps includes an axially outwardly extending threaded nipple.

4. The assembly of claim 3 wherein the other of said closure caps includes a centering means attached thereto.

5. The assembly of claim 1, 2 or 3 wherein the closure caps are made of insulating material.

6. An electrostatic water treatment apparatus comprising a cylindrical shell adapted to hold water under pressure, said shell having end closures and a water inlet and outlet; an electrode assembly extending into said shell and forming with said shell an annular passageway through which water is adapted to flow between said inlet and outlet, said electrode assembly comprising:
   (a) an elongated, cylindrical electrode,
   (b) end closure cap members for said electrode, at least one of said end caps having cylindrical side walls, with an inner portion thereof telescoping within said cylindrical electrode and an outer shoulder portion thereof extending axially outwardly beyond the end of the electrode,
   (c) a continuous coating of silicone adhesive covering the exterior of the electrode and the outer shoulder portion of the end cap,
   (d) a thin, impervious insulating sleeve overlying the silicone adhesive coating and also covering the exterior of the electrode and the outer shoulder portion of the end cap, and
   (e) ring clamp means surrounding said outer shoulder portion of the end cap and securely clamping the insulating sleeve and silicone adhesive coating thereto,
   thereby permitting rapid expansion and contraction of the assembly due to sudden temperature changes while preventing leakage of water into the interior of the electrode or between the electrode and the insulating sleeve.

7. An apparatus according to claim 6 wherein the electrode has two end closure caps, each having cylindrical side walls, with an inner portion thereof telescoping within said cylindrical electrode and an outer shoulder portion thereof extending axially outwardly beyond the end of the electrode.

8. An apparatus according to claim 7 wherein one of said electrode closure caps includes an axially extending threaded nipple which extends through an axial opening in one of said shell end closures and the other of said electrode closure caps includes centering means adapted to center the electrode within the shell.